United States Patent [19]
Cable

[11] Patent Number: 5,953,527
[45] Date of Patent: Sep. 14, 1999

[54] METHOD AND APPARATUS FOR MIXING OBJECTIVE-C AND C++ OBJECTS

[75] Inventor: Laurence P. G. Cable, Mountain View, Calif.

[73] Assignee: Sun Microsystems, Inc., Mountain View, Calif.

[21] Appl. No.: 08/636,572

[22] Filed: Apr. 23, 1996

[51] Int. Cl.⁶ ........................................................ G06F 9/44
[52] U.S. Cl. ............................ 395/703; 395/683; 395/701
[58] Field of Search ....................................... 395/701, 702, 395/703, 680, 681, 682, 683, 684, 685, 500

[56] References Cited

U.S. PATENT DOCUMENTS

| | | | |
|---|---|---|---|
| 5,481,721 | 1/1996 | Serlet et al. | 395/700 |
| 5,488,723 | 1/1996 | Baradel et al. | 395/700 |

FOREIGN PATENT DOCUMENTS 0 546 683 A2   6/1993   European Pat. Off. .

OTHER PUBLICATIONS

Davis et al., "Sweet Harmony: The Talk/C ++ Connection", *Proceedings of the 1994 ACM Conference on LISP and Functional Programming*, pp. 121–127, Jun. 27–29, 1994.

Trehan et al., "Concurrent Object Oriented 'C'", *ACM SIGPLAN Notices*, 28(2):45–52 (1993).

Wolfsthal, "The Road to Effective Software", *IEEE Communications Magazine*, 32(4):84–87 (1994).

"The Real Advantages of Pure Object–Oriented Systems or Why Object–Oriented Extensions to C are Doomed to Fail", LaLonde W.R. et al., COMPSAC 1989, pp. 344–350, 1989.

"Distributed Object Oriented Language and Operating System", Trehan R. et al., Proc. of the Twenty–Sixth Hawaii Int. Conf. on System Sciences, pp. 70–79, Jan. 1993.

"Sweet Harmony: The Talk/C++ Connection", Davis H. et al. ACM, pp. 121–127, Jun. 1994.

*Primary Examiner*—Tariq R. Hafiz
*Assistant Examiner*—Kakali Chaki
*Attorney, Agent, or Firm*—William S. Galliani; Pennie & Edmonds LLP

[57] ABSTRACT

A method and apparatus for mixing Objective-C and C++ objects includes the step of defining a common object as an Objective-C object class data structure. In addition, the common object is specified as a C++ object class data structure. Thus, the C++ object class data structure is equivalent in memory layout to the Objective-C object class data structure. A set of behavioral operations to be performed in relation to the common object are then established in either Objective-C or C++ source code. A selected behavioral operation is subsequently performed in relation to the common object in response to mixed Objective-C and C++ source code instructions.

14 Claims, 3 Drawing Sheets

METHOD AND APPARATUS FOR MIXING OBJECTIVE-C AND C++ OBJECTS

BRIEF DESCRIPTION OF THE INVENTION

This invention relates generally to object-oriented computer programming languages. More particularly, this invention relates to a technique for combining Objective-C computer source code and C++ computer source code in a single computer source code program to define objects with both Objective-C and C++ attributes.

BACKGROUND OF THE INVENTION

Different computer languages have different strengths and weaknesses. For example, the computer language known as "Objective-C" has the powerful attribute of being "dynamically bound", meaning that method invocations upon an object are resolved at run-time. This approach is in contrast to the computer language known as "C++", which is "statically bound", meaning that method invocations are resolved at compilation time.

While Objective-C enjoys the benefit of being dynamically bound, there are a number of benefits associated with C++. First, C++ provides language support for the automatic construction and destruction of object instances. In C++ there is support in the language itself to automatically initialize an object as a side effect of its definition, and also to destroy it when its definition is no longer in scope. In Objective-C there is no such language support, support is provided by a set of conventions defined in the root object of the language system's class hierarchy. This lack of support requires that the programmer explicitly manage the creation and destruction of Objective-C objects. This process is error-prone, thereby complicating the programmer's tasks.

Another benefit of C++ is that any arbitrary object may be allocated in memory from the program heap or the program stack. Being able to allocate objects on the program stack allows a programmer the freedom to exercise significant performance gains. That is, by allocating objects on the program stack, overhead is avoided for invoking memory allocator functions to obtain and subsequently release memory from the program heap. Objective-C has no provision to allocate objects in memory from the program stack.

Finally, the Interface Definition Language (IDL) promulgated by the Object Management Group supports C++, but not Objective-C. This implies that it is not possible to develop distributable object servers within the Common Object Request Broker Architecture using the Objective-C language as the implementation language.

In view of the foregoing, it would be highly desirable to supplement the strengths of Objective-C with the strengths of C++. More particularly, it would be highly desirable to provide a technique of exploiting the benefits of both Objective-C and C++ in the same source code program.

SUMMARY OF THE INVENTION

A method and apparatus for mixing Objective-C and C++ objects is described. The method includes the step of defining a common object as an Objective-C object class data structure. In addition, the common object is specified as a C++ object class data structure. Thus, the C++ object class data structure is equivalent in memory layout to the Objective-C object class data structure. A set of behavioral operations to be performed in relation to the common object are then established in either Objective-C or C++ source code. A selected behavioral operation is subsequently performed in relation to the common object in response to mixed Objective-C and C++ source code instructions.

The invention preserves the benefits of Objective-C, while exploiting the benefits of C++. In particular, the invention allows programmers to easily use Objective-C objects, while gaining the benefits of C++ language support for the automatic creation and destruction of objects. In addition, the invention allows the creation of Objective-C objects on a program stack. Finally, the invention allows Objective-C to be used to create distributed objects within a Common Object Request Broker Architecture.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
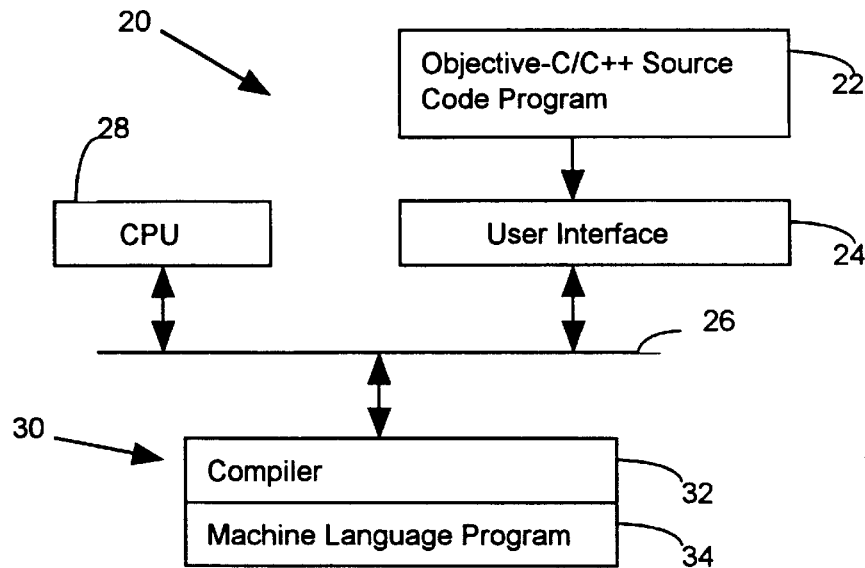
FIG. 1 is a general illustration of an apparatus that may be used to practice the present invention.

FIG. 1 illustrates a computer 20 that may be used to practice the present invention. A mixed Objective-C/C++ source code program 22 is entered into the user interface 24 of the computer 20. The user interface 24 generally refers to any input/output device associated with the computer 20. Typically, the mixed Objective-C/C++ source code program 22 will be keyed into the computer 20 through the use of a keyboard (not shown) associated with the user interface 24. The program 22 is delivered over a bus 26 to a Central Processing Unit (CPU) 28. The CPU 28 processes the program in connection with a compiler 32 stored in a memory 30. The memory 30 may be implemented as any storage medium known in the art, including RAM, disc storage, and optical storage. The compiler 32 produces a corresponding machine language program 34 for execution.

Those skilled in the art will recognize that FIG. 1 illustrates several standard computer features. However, those skilled in the art will also recognize that FIG. 1 illustrates a novel mixed Objective-C/C++ source code program. That is, in accordance with the invention, a single program includes Objective-C and C++ source code instructions. Those skilled in the art will also recognize that the compiler 32 must be configured to process mixed source code instructions of this type. The nature of the invention's Objective-C/C++ source code program 22 and compiler 32 are described below.

Figure 2:
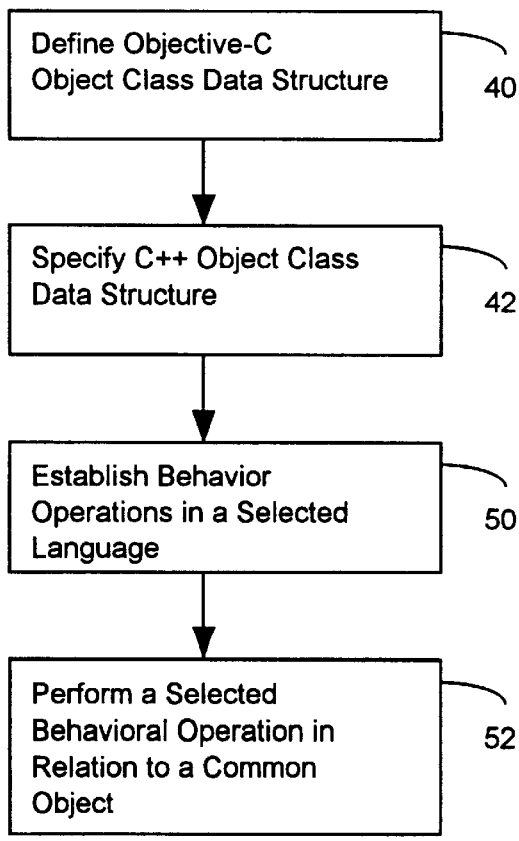
FIG. 2 illustrates the processing steps associated with one embodiment of the invention.

FIG. 2 illustrates processing steps associated with a program 22 in accordance with the present invention. The first step of such a program is to define an Objective-C object class data structure (step 40). The next step is to specify a C++ object class data structure (step 42). This operation is more fully appreciated with reference to FIG. 3.

Figure 3:
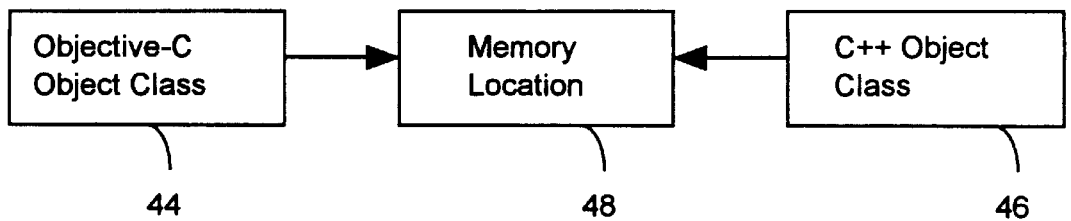
FIG. 3 illustrates the relationship between an Objective-C object class, a C++ object class, and the memory location they both specify.

FIG. 3 illustrates an Objective-C object class pointing to a memory location 48 (of memory 30 of FIG. 1). The figure also illustrates a C++ object class pointing to the same memory location 48. Thus, the C++ object class data structure is equivalent in memory layout to the Objective-C object class data structure. Consequently, a single object class (or common object) is defined with two sets of class members that are equivalent. Another way of viewing this is that the C++ object model is mixed with the Objective-C object model to create a class that can provide instances that are simultaneously C++ and Objective-C objects.

Returning to FIG. 2, the next processing step associated with the invention is to establish behavior operations for the object class in a selected language, either C++ or Objective-C. The behavior operations establish the functions that can be performed in relation to a common object of the invention. This operation is more fully appreciated with reference to FIG. 4.

Figure 4:
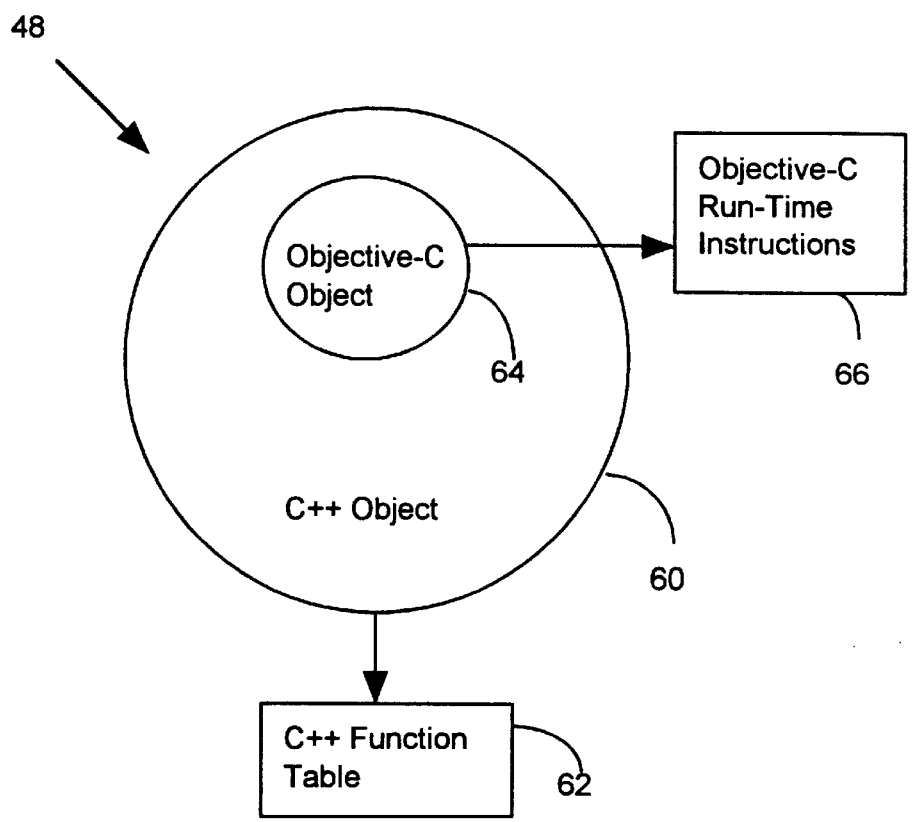
FIG. 4 illustrates a C++ object wrapping an Objective-C object to form a mixed C++/Objective-C object in accordance with one embodiment of the invention.

FIG. 4 illustrates a C++ object 60 at memory location 48. The C++ object 60 wraps an Objective-C object 64. That is, a common or mixed object is formed, as will be more fully described below. The C++ object points to a C++ function table 62. Similarly, the Objective-C object 64 points to Objective-C run-time instructions 66.

Returning again to FIG. 2, the final processing step associated with the invention is to perform selected behavioral operations in relation to the defined common object. In other words, the common object at memory location 48 of FIG. 4 is subject to different processing operations, as assisted by the C++ function table 62 and the Objective-C run-time instructions 66.

This description of the invention is more fully appreciated with reference to an example. The following code is an example of step 40 of FIG. 2. That is, the following code is an example of the step of defining an Objective-C object class data structure.

```
(0)    #ifndef __MutableArray_h__
(1)    #define __MutableArray_h__
(2)    #import <Foundation/Foundation.h>
(3)    @interface MutableArray : NSMutableArray
(4)    @private
(5)        unsigned int    __count;
(6)        unsigned int    __length;
(7)        id*             __items;
(8)    + (id) alloc;
(9)    - (void) dealloc;
(10)   - (unsigned) count;
(11)   -(id) objectAtIndex: (unsigned) index;
```

-continued

```
(12)   -(void) addObject: (id) anObject;
(13)   -(void) replaceObjectAtIndex: (unsigned) index
                withObject: (id) anObject;
(14)   -(void) insertObject: (id)anObject atIndex:
                (unsigned) index;
(15)   -(void) removeObjectAtIndex: (unsigned) index;
(16)   @end
(17)   #endif
```

Lines (0), (1), and (17) demark the beginning and end of the filed called "MutableArray_h_". These instructions protect the content of the file, so that if the file is referenced multiple times, the compiler only observes one definition of it. The "Mutable Array" defined by the file is a dynamic vector of object references. An efficient implementation of such an array requires the dynamic binding that is available with Objective-C.

Line (2) is an import of the header file "Foundation.h". The header file describes all the interfaces to the Objective-C Foundation Kit Library, which is a publicly available specification. The Objective-C Foundation Kit Library includes an object called NSMutable Array. The present code forms a sub-class of this object.

Line (3) is the start of a class definition. The instruction defines the class "MutableArray" as a sub-class of the class "NSMutableArray". At line (4), the contents of this subclass are defined as private, such that the implementation cannot be seen outside the class.

The defined class contains three instance variables. An unsigned integer variable "__count" is defined at line (5). The "__count" variable represents the number of items in the array at any given time. An unsigned integer variable "__length" is defined at line (6). This variable represents the number of bytes of dynamic memory currently allocated to hold the dynamic array. Finally, at line (7), a pointer "id*" to an array of items is declared. As will be more fully appreciated below, these instance variables characterize the Objective-C object class data structure.

At line (8) there is a declaration of an Objective-C class method called "alloc", which returns a reference to the newly created object. This method is called to create a new instance of an object.

Line (9) defines an instance method "dealloc", which is called when an instance of an object is released. Line (10) defines an instance method called "count", which returns the number of objects currently held in the mutable array. Line (11) defines a method for indexing one of the items in the array; the method takes a parameter index between zero and the number of items that can be held in the array. Line (12) has a method called "addObject", which allows the addition of an object to the end of the array. Line (13) defines a method to replace an object at a specified index value. Line (14) defines a method to insert an object at a specified index value. Finally, at line (15) a method is defined to remove a particular object at a specified index value.

It should be noted that the foregoing Objective-C class header file is consistent with known Objective-C class header files. In other words, the foregoing Objective-C class header file standing alone does not indicate that it is part of a shared Objective-C/C++ object.

The following lines of code are used to specify a C++ object class data structure (step 42 of FIG. 2).

```
(21)  #ifndef __Cpp__MutableArray__h__
(22)  #define __Cpp__MutableArray__h__
(23)  #import <MutableArray.h>
(24)  class Cpp__MutableArray{
(25)      protected:
(26)          static const unsigned
                  int__items__incr__sz;
(27)          struct {@defs(MutableArray);} self;
(28)      public:
(29)          Cpp__MutableArray();
(30)          Cpp__MutableArray(Class __class);
(31)          ~Cpp__MutableArray();
(32)          virtual unsigned count();
(33)          virtual id objectAtIndex(unsigned
                                      index);
(34)          virtual unsigned indexOfObject(id
                                      anObject);
(35)          virtual void addObject(id anObject);
(36)          virtual void insertObjectAtIndex
                       (id anObject, unsigned
                                      index);
(37)          virtual void
                 replaceObjectAtIndexWithObject
                       (Unsigned index, id
                                      anObject);
(38)          virtual void removeObject(id
                                      anObject);
(39)          virtual void removeObjectAtIndex
                       (Unsigned index);
              #endif
```

As in the previous example, the first two lines of code (lines (21) (22)) and the last line of code (the "#endif" statement) are used to protect the contents of the header file so the compiler only observes a single definition.

Line (23) imports the Objective-C header file described in lines (0)–(15). The definition of the Objective-C object is imported, and now a corresponding object will be defined in C++. This is done at line (24) with the beginning of the class declaration for the C++ object. The "protected" instruction of line (25) indicates that the following definitions are not visible external to this class, they are only visible to sub-classes.

The instruction at line (26) defines a constant used in the implementation of the Objective-C class to describe the size of the memory increments.

The instruction ("@defs") at line (27) imports the Objective-C instance variables. These variables are used to define a C++ object. In other words, this import operation creates a C++ class data structure that is exactly equivalent in memory layout to the Objective-C class data structure. Consequently, a C++ object is defined with the same instance variables in the same order as the definitions for the instance variables in an Objective-C object. Thus, there are two definitions that are identical for the same piece of memory (as shown in FIG. 3).

The success of this technique is guaranteed by the semantics of C++ and Objective-C. C++ establishes that a class is equivalent to the structural implementation of the class (e.g., Foo== Struct FooImpl). In other words, if a class is defined with a single member which is an integer, and then a structure is defined with a single member in it, which is an integer, then both of those objects are identical in terms of layout in memory and the semantics of the content of that memory.

Objective-C establishes that a class is equivalent to the structure of the definitions implementing the class (e.g., Class Foo== struct {@defs(Foo);} FooImpl;). In other words, if you declare an Objective-C object of class Foo and a structure containing the same instance variables, then both are equivalent in terms of layout and semantics in program memory.

Thus, the invention effectively merges the two computer languages by defining a single object class with two language definitions (Objective-C and C++) that are equivalent. In other words, both class members define a structure that fit into the common object class.

Returning again to the source code, line (27) defines a structure within the C++ class. In particular, an instance variable "self" is defined, which is a structure that contains the definitions of all the instance variables as defined for the Objective-C class. In other words, the C++ statement "@defs" imports the Objective-C data structure of "MutableArray", as defined above at lines (5)–(7). That is, the statement of line (27) is equivalent to the statement:

```
struct {
    unsigned    __count;
    unsigned    __length;
    id*         __items;
} self
```

Lines (28)–(39) define the C++ interfaces to this class object. This operation is analogous to the operations of lines (5)–(15) in relation to the Objective-C code.

The directive at line (28) indicates that the definitions that follow in the class are usable external to the class. In other words, through this directive, clients of this object can access this object.

The instructions at lines (29) and (30) describe the constructor operation in C++. A constructor is a special function that belongs to a class that creates an instance of the class and then initializes the instance to an initial state. The constructor at line (29) is a default constructor, while the constructor at line (30) takes a parameter, which is a pointer or reference to an Objective-C class. The pointer is used for creating sub-classes. In accordance with the invention, the constructor operation is automatically executed on the common Objective-C/C++ object.

The destructor function of C++ is defined at line (31). This function is called whenever a C++ object is released by the program, so that objects can be cleaned- up. In accordance with the invention, the destructor operation is performed on a common Objective-C/C++ object.

Lines (32) through (39) correspond to the Objective-C methods of lines (8)–(15). Line (32) defines a method "count", which corresponds to line (10) of the Objective-C code. Line (34) defines a method that does not have a counterpart in the Objective-C portion. Thus, in accordance with the invention, a one-to-one mapping of methods is not required, it is possible to have more interfaces in one language than the other. The remaining lines of code define additional methods.

The following code establishes behavioral operations for the specified common object.

```
(40)  #import <Cpp_MutableArray.h>
(41)  #import <memory.h>
(42)  @implementation MutableArray
(43)  +(id) alloc{
(44)      return (id) (new
                 Cpp_MutableArray((Class)self));}
(45)  -(void) dealloc{
(46)      delete (Cpp_MutableArray *)self;}
(47)  -(unsigned) count{
(48)      return ((Cpp_MutableArray *)self)->count();}
(49)  -(id) objectAtIndex: (unsigned) index{
(50)      return ((Cpp_MutableArray *)self)->
                 ObjectAtIndex(index);}
(51)  -(void) addObject: (id) anObject{
(52)      ((Cpp_MutableArray *)self)->
                 addObject(anObject);}
(53)  -(void) replaceObjectAtIndex: (unsigned)
                 index withObject: (id) anObject{
(54)      ((Cpp_MutableArray *)self)->
             replaceObjectAtIndexWithObject(index,
             anObject);}
(55)  -(void) insertObject: (id)anObject atIndex:
                 (unsigned) index{
(56)      ((Cpp_MutableArray *)self)->
                 insertObjectAtIndex(anObject, index);}
(57)  -(void) removeObjectAtIndex: (unsigned) index{
(58)      ((Cpp_MutableArray *)self)->
                 RemoveObjectAtIndex(index);}
(59)  @end
```

Line (40) imports the C++ header file "Cpp_MutableArray.h", which in turn, imports the Objective-C header file definition for the Objective-C class, using the structural mechanism previously described. Note in this example that the Objective-C object's behavior is defined in terms of the C++ class. Those skilled in the art will recognize that the invention can also operate by defining the C++ class in terms of Objective-C.

Line (42) is a standard Objective-C command which tells the compiler that the definitions which follow are the definitions for the Objective-C class called "MutableArray". Line (43) is the Objective-C method definition for "alloc", which is defined at line (8). Line (44) calls the C++ class "Cpp_MutableArray". Thus, the Objective-C method is creating a C++ object. Note that the constructor "Cpp_MutableArray" is being called with a parameter "class", which is defined at line (30) above. The parameter that is passed in is the reference to the Objective-C runtime description of the Objective-C class.

In Objective-C every object class has some representation in the program memory during the life of the program. The programmer has a reference to that implementation. That reference can be used to manipulate the actual class itself. In this method, the reference to the Objective-C runtime implementation of the class is passed to the C++ constructor. This feature is critical because in order for the C++ object and the Objective-C object to be the same object simultaneously, the Objective-C environment must have the requisite reference from the instance back to the class initialized. This operation is more fully appreciated with reference to FIG. 5.

Figure 5:
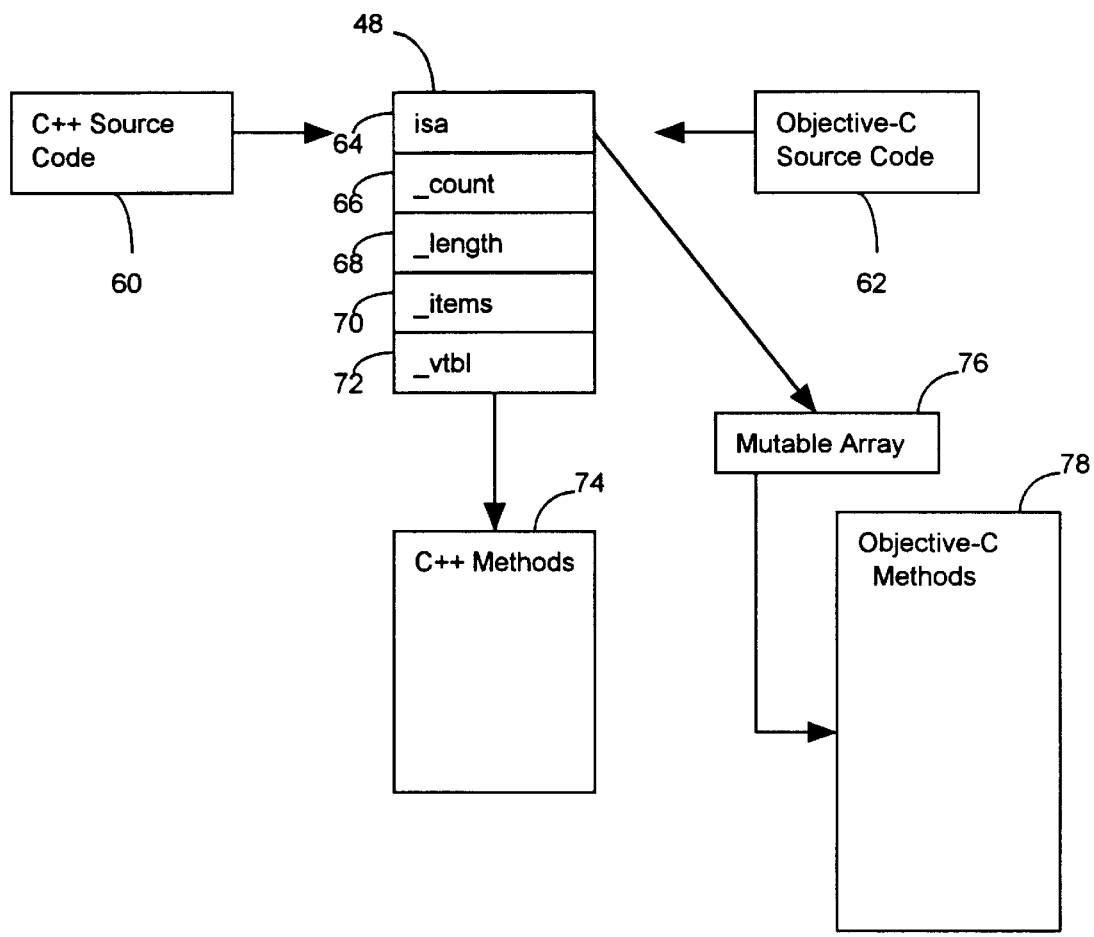
FIG. 5 illustrates a mixed C++/Objective-C object and its associated pointers, in accordance with one embodiment of the invention.

FIG. 5 illustrates that a common object has been created at memory location 48. That is, C++ source code 60 and Objective-C source code 62 have defined a common object at memory location 48. The common object has an instance variable "isa". All instances of Objective-C objects have an instance variable called "isa", which is a reference from the instance of the object back to the class object. In this case, the reference is to the "Mutable Array" object class 76, which belongs in an Objective-C method table 78.

The C++ constructor method initializes the "isa" instance variable to the "Mutable Array" reference. Thus, when the C++ object is constructed, it initializes the Objective-C portions of the C++ object. Consequently, in accordance with the invention, there is automatic initialization of an Objective-C object as a side effect of its definition. This capability is not available in the native Objective-C environment.

FIG. 5 also illustrates the common object including instance variables "_count" 66, "_length" 68, and "_items" 70. In addition, the common object has a Virtual Memory Table reference 72. In the C++ environment, the end of each object has a reference to a Virtual Memory Table, which points to a table of C++ methods 74.

Thus, at line (43) the class method "alloc" is invoked on the objective-C class "MutableArray". This method calls the C++ constructor for the C++ counterpart class, and passes in the reference to the Objective-C class mutable array. The C++ constructor takes this reference, initializes the "isa" instance variable and the actual instance of the object and then initializes the object so that it can be an Objective-C object.

Line (45) calls the method "dealloc", which is defined at line (9). This is the Objective-C instance method that gets called to release objects when they are being freed. At line (46) the C++ delete operator is called on the "self" object being referenced. Thus, Objective-C syntax is being used, but C++ language features are used to destroy an object. Consequently, in accordance with the invention, destruction of an Objective-C object occurs as a side effect of the C++ destructor method function.

Lines (47)–(58) are method calls between Objective-C and C++. For example, line (47) defines the Objective-C method "count" that was introduced at line (10). At line (48) the C++ counterpart method is called and assigned the value defined at line (32).

At line (49) the method "ojbectAtIndex" is defined. This method was introduced at line (11). At line (50) the C++ method is called, which was introduced at line (33). A similar approach is used in lines 51–58.

The following C++ code specifies behavioral operations that can be performed on the common object of the invention.

```
(60)  const unsigned int Cpp_mutableArray::
                 _items_incr_sz = 8;
(61)  Cpp_MutableArray::Cpp_MutableArray(Class
                 _class){
(62)      self.isa = _class;
(63)      self._length = _items_incr_sz;
(64)      self._count = 0;
(65)      self._items = new id[self._length];}
(66)  Cpp_MutableArray::Cpp_MutableArray(){
(67)      Cpp_MutableArray::Cpp_MutableArray((Class)
                 [MutableArray class]);}
(68)  Cpp_MutableArray::Cpp.MutableArray(){
(69)      unsigned int i;
```

-continued

```
(70)        for (i=0; i< self._count; i++)
                [self._items[i] autorelease];
(71)        delete [ ] self.items;
(72)    unsigned Cpp_MutableArray::count ()
(73)        return self._count;}
(74)    id Cpp_MutableArray::objectAtIndex(unsigned
                        index){
(75)        if (index >= self._count) throw
                        "OutOfBounds";
(76)        return self._items[index];}
(77)    unsigned Cpp_MutableArray::indexOfObject
                        (id anObject){
(78)        unsigned int i;
(79)        for (i = 0; i < self._cont && anObject
                !=self.items[i]; i++);
(80)        if (i == self._count) through
                        "OutOfBounds";
(81)        return i;}
(82)    void Cpp_MutableArray::addObject (id anObject){
(83)        this>insertObjectAtIndex
                    (anObject,self._count);}
(84)    void Cpp_MutableArray::removeObject(id
                        anObject){
(85)        unsigned int i;
(86)        for (i=0; i< self._count && anObject
                !=self._items[i]; i++);
(87)        if (i < self._count)
                This->removeObjectAtIndex(i);
(88)        else throw "Not Found";}
(89)    void
(90)    Cpp_mutableArray::
            replaceObjectAtIndexWithObject(unsigned
                        index,id anObject) {
(91)        if (index < self._count){
                [self._items[index] autorelease];
                self._items[index]= (anObject retain];
(92)        } else throw "OutOfBounds";}
(93)    void Cpp_MutableArray::insertObjectAtIndex
                (id anObject, unsigned index){
(94)    If (index <= self._count){
(95)        unsigned   _oldLength  = self._length;
(96)        id*         _new       = self._items;
(97)        id*         _old       = self._items;
(98)        if (self._count && self._count %
                        _items_incr_sz ==0){
                _new = new id[self._length+=
                        _items_incr_sz];
(99)        if (_new == (id*)NULL){
                self._length = _oldLength;
                throw "OutOfMemory";}}
(100)       if (index > 0 && _new != _old){
                memcpy((void*)_new,
                (void *)_old, sizeof(id)
                        *index);}
(101)       if (index < self._count++){
                memcpy((void*)(_new + index + 1),
                (void *)(_old + index),
                sizeof(id) * (self._count -
                        index - 1);}
(102)       if (_old != _new) {
                delete [ ] _old;
                self._items = _new;}
(103)       self._items[index] = [anObject retain];}
(104)       else{
                self._count--;
                throw "OutOfBounds"; }}
(105)   void Cpp_MutableArray::removeObjectAtIndex
                        (unsigned index){
(106)       if (index < self._count){
(107)           unsigned _oldLength =
                            self._length;
(108)           id*_new=self._items;
(109)           id*_old= self._items;
(110)           [self._items[index] autorelease];
(111)           if(--self._count !=0 && self._count %
                    _items_incr_sz -= 0){
                _new = new id[self._length ==
                    _items_incr_sz];
(112)           if (_new == (id*)NULL){
                    self._length = _oldLength;
                    throw "OutOfMemory";}}
(113)       if (index > 0) {
                memcpy((void *)_new, (void *)_old,
                index *( sizeof(id));}
(114)       if (index < self._count) {
                memcpy((void *)(_new +index),
                    (void *)(_old + index + 1),
                    (self._count - index) *
                        sizeof(id)};
            }
(116)       if (_new !=_old){
                delete [ ] _old;
                self.items = _new;}
            }
(117)   else throw "OutOfBounds"; }
```

Line (60) defines the constant specified at line (26). Thus, the MutableArray will change sizes in 8 unit blocks. Line (61) is the definition for the constructor at line (44). In particular, the constructor "Cpp_MutableArray" is defined, which takes a single parameter which is a reference to an Objective-C class.

At line (62) it can be observed that the C++ constructor is initializing the instance variable "isa" to refer to the parameter that is passed in. It can be seen at line (44) that what is being passed in is the reference to the class that was being asked to provide a new instance of itself. This operation is illustrated in FIG. 5.

Line (63) initializes the length of the constant "items_incr_sz", line (64) initializes the variable "count" to zero, and line (65) creates an initial "items" array to the "self_length" value.

Line (66) defines a default constructor that is called when there is no explicit constructor called (such as at line 44). Line (67) sends a message to the Objective-C class "MutableArray" to return itself. Thus, this operation establishes another path to the Objective-c environment.

Line (68) is the C++ destructor. This method gets called whenever an object is released from the program. The destructor removes an object by iterating across the objects that exist in the array and then releases an indexed object. The delete operation is called at line (71).

Line (72) has the definition for the "count" method in the C++ object. Line (73) returns the "count" instance variable defined at line (5).

Lines (74)–(76) are used to make sure the bounds of the array do not exceed a specified limit. If so, an error or exception is called (line (75)).

Line (77) takes an object reference and then scans the array to find an equivalent object in the array. Line (79) illustrates the iteration operation across the items. Line (80) throws an exception if the item is not found, otherwise the index value is returned by line (81).

Lines (82) and (83) define a method to append an object at the end of the mutable array. This method is expressed in terms of the method "insertObjectAtIndex", which is declared at line (36).

Lines (84) through (88) are used to remove an object from the mutable array. Line (86) is an iteration operation through the list to find an object identical to the parameter passed in.

If the object is found, it is removed with the instruction at line (87), otherwise an exception is thrown at line (88).

Lines (89) through (92) are used to overwrite an existing object with a new object. Line (91) checks to insure that the index value is in bounds; if so, the object is overwritten at the specified location.

Lines (93) through (104) are used to insert an object at an index value. The method assesses whether the mutable array is large enough to insert the object, and if not, inserts sufficient dynamic memory to accommodate the object. Line (94) checks to determine whether the index value is in bounds, if not, an exception is thrown at line (104). If the index value is in bounds, then lines (95) through (97) are used to define local variables. Line (98) creates a new array called "_new" that has an array size, "self_length", that has been increased by the previously specified constant "items_incr_sz". Line (99) throws an exception if the creation of the new array failed. At line (100) a check is made to determine whether additional dynamic memory was necessary, if so the old list is copied into the new list. Line (101) checks to see if the object to be inserted is anywhere but at the end of the list, and if so, then the old list of items is copied up to the present pointer location. Line (102) is used to delete the old array of items when a new array of items is defined. Line (103) is used to insert the object at the specified index value.

Lines (105) through (117) are used to remove an object from the dynamic array. This method shrinks the dynamic array after an object is removed from it. Line (106) checks whether the index value is in bounds, if not an exception is thrown at line (117). Lines (107) through (109) define pointers to the old array of items and a new array of items. Line (110) enables the release of the object stored in the array at the specified index. Line (111) decrements the item count for the array and creates the new array of items equal in length to the current lengh minus the length of the discarded object. Line (112) throws an exception if the creation of the new array fails. Line (113) copies the memory items from the old list up to the item being removed, and copies it to the new list. Line (114) copies the memory items from the old list which follow the removed object to the new list. Line (116) checks to see if a new array has been allocated, then the old array is released, and the current list of items is set to point to the new array.

In summary, the implementation of the C++ objects has now been described. That is, all of the methods for the C++ and Objective-C interfaces have been linked. Thus, there is a working class of objects that implements a mutable array. A set of behaviors have been described that are simultaneously defined in terms of an Objective-C object and a C++ object. That is, the constructs of each language have been used to define a common behavior. A single object at a single memory location responds to the behavior, regardless of which language is chosen to express the behavior.

Having defined the common object and its potential behaviors, simple operations in reference to the common object are now described in the following main program. That is, the following code is used to perform selected behavioral operations on a common object (step 52 of FIG. 2).

```
(120)  main (const int argc, const char **const argv)
(121)       NSAutoreleasePool*    pool =
                         [NSAutorreleasePool new];
(122)       unsigned int          i;
(123)       MutableArray*         p = [[[MutableArray alloc]
                                       init] autorelease];
(124)       Cpp_MutableArray*     pp =
                                  (Cpp_MutableArray*)p;
(125)       for (i=0; i< 1000; i++){
                 id obj = (NSNumber numberWithInt:i];
(126)            [p addObject: obj];
(127)            pp->addObject (obj);}
(128)       [pool release];}
```

Line (120) defines the main program. Line (121) defines the "NSAutoreleasePool*", which is an Objective-C class that is part of the memory management system. When a memory object is auto-released in Objective-C, it is added to an auto-release pool. Subsequently, when the object's reference count goes to zero, the auto-release pool discards the object. Thus, it is the Objective-C run-time mechanism for handling and freeing dynamic memory.

Line (122) defines an integer that will be used to populate a mutable array. Line (123) creates an Objective-C mutable array object with run-time binding. In particular, the Objective-C syntax is used to send the Objective-C class "MutableArray" to the "alloc" method. When that method returns, the "init" method is invoked, and then the "autorelease" method is called. In particular, the statement "MutableArray alloc" calls line (43), which causes line (44) to call the C++ "new" operator, which causes the C++ runtime environment to ask for a new piece of memory large enough to hold a Cpp_MutableArray object, which is the C++ counterpart of the Objective-C object. Then the constructor for that class is called, and the reference for that Objective-C object class "MutableArray" is passed in. Thus, the C++ constructor at line (61) is called. At line (62) the C++ object is initialized. This is where the C++ constructor initializes the "isa" instance variable of the Objective-C object to point back to the class. Then, the other instance variables are set up at lines (63) through (65).

Line (124) defines a pointer to a C++ object. That object is then assigned to be equal to "p". Thus, there is a variable "p", which points to an Objective-C mutable array object, and variable "pp", which is pointing to the same object, but is actually the C++ object. Consequently, there are two variables pointing to the same object in memory. One variable observes it as an Objective-C object, and the other variable observes it as a C++ object.

Note that the syntax of line (124) creates a stack object. Thus, the common object with Objective-C attributes can be treated as a stack object. Recall that the native Objective-C environment does not support stack objects. Thus, the present invention provides the benefit of processing Objective-C objects on a stack.

Line (125) defines an incrementing loop used to populate a mutable array object with a set of objects. "NSNumber" is an OpenStep Foundation class that returns an object with an integer, the index value "i" in this case.

Line (126) is an example of calling an Objective-C method on an Objective-C object. This operation causes the newly created number object to be appended to the end of the mutable array. In particular, line (126) calls the method at line (51), which calls the Objective-C method "addObject" at line (52). The Objective-C method "addObject" is at line (82). Line (82) is a C++ method which calls line (83), which invokes the "insertObjectAtIndex" method at line (93), causing the object to be inserted at the end of the mutable array. Thus, processing began at an Objective-C object method invocation, and ended with a C++ object method invocation.

Line (127) calls the C++ method "addObject" on the same object. Thus, the number object is added to the mutable array twice. This is done through line (82), which calls line (83), which invokes the "insertObjectAtIndex" method at line (93).

The "pool release" instruction at line (128) tells the pool to release itself, which allows it to release objects added to the pool. The only object added to the pool is the MutableArray object of line (123). Calling "release" at line (128) will call the "dealloc" method at line (45), which calls the C++ delete operator, which calls the C++ destruct operator at line (68). In sum, it frees the memory space associated with the "MutableArray".

The foregoing description of the invention will allow those skilled in the art to recognize a number of benefits associated with the disclosed technology. The invention preserves the dynamic binding benefits of Objective-C, while exploiting the benefits of C++. In particular, the invention allows the benefits of C++ language support for the automatic creation and destruction of objects. In addition, the invention allows the creation of Objective-C objects on a program stack. Finally, since an Objective-C object can be wrapped as a C++ object, the invention allows Objective-C to be used to create distributed objects within a Common Object Request Broker Architecture.

The invention has now been fully described. Attention presently turns to some implementation considerations and alternate embodiments of the invention.

The compiler 32 of the invention is a compiler that recognizes both C++ and Objective-C statements. For example, the compiler 32 may be implemented as a C++ compiler that is augmented to read Objective-C syntax. That is, the tokenizer of a C++ compiler may be modified to identify new token types for Objective-C method calls and declarations.

A modification to the Objective-C runtime environment is also necessary to practice the invention. In particular, the Objective-C run-time environment must be modified to bound check memory addresses to determine whether the memory address to be returned to the heap is actually in the heap. If the address is not in the heap, no action is taken. In this way, the run-time environment does not attempt to return memory to the program heap during deallocation of objects on the stack.

Those skilled in the art will recognize that the invention can also be implemented using a template. That is, a C++ template class can be used as a pointer to an Objective-C object. When the C++ object leaves the stack, the referenced Objective-C object is automatically released. Thus, the explicit memory management of Objective-C is converted into the implicit memory management of C++.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

I claim:

1. A method executed by a computer under the control of a program, said computer including a memory storing said program, said method comprising the steps of:

using a common object defined as an object class data structure in a first computer language, wherein said using step includes the step of defining said common object as a set of instance variables characterizing an Objective-C object class data structure;

utilizing said common object specified as an object class data structure in a second computer language, wherein said utilizing step includes the step of specifying a C++ object class data structure by importing said set of instance variables characterizing said Objective-C object class data structure;

providing a set of behavioral operations to be performed on said common object; and performing a selected behavioral operation on said common object in response to mixed source code instructions in said first computer language and said second computer language.

2. The method of claim 1 further comprising the step of deriving from said common object, a mixed object instance with C++ and Objective-C attributes.

3. The method of claim 1 wherein said performing step includes the step of creating and destructing an instance of said common object in response to C++ processing operations.

4. The method of claim 1 wherein said performing step includes the step of placing said common object on a program stack.

5. A computer readable storage medium used to direct a computer to function in a specified manner, comprising:

executable instructions stored in said storage medium, said executable instructions including:
 instructions to define a common object in a computer as an Objective-C object class data structure;
 instructions to define in said computer said common object as a set of instance variables characterizing said Objective-C object class data structure;
 instructions to specify in said computer said common object as a C++ object class data structure;
 instructions to specify said C++ object class data structure by importing said set of instance variables; and instructions to derive in said computer, from said common object, a mixed object instance with C++ and Objective-C attributes.

6. The computer readable storage medium of claim 5 further comprising executable instructions to establish a set of behavioral operations to be performed by said computer in relation to said mixed object instance.

7. The computer readable storage medium of claim 6 further comprising executable instructions to perform a selected behavioral operation on said mixed object instance in response to mixed Objective-C and C++ source code instructions.

8. The computer readable storage medium of claim 7 further comprising executable instructions to place said mixed object instance on a program stack.

9. The computer readable storage medium of claim 7 wherein executable instructions chose said selected behavioral operation from said set of behavioral operations.

10. The computer readable storage medium of claim 5 wherein said executable instructions to establish said set of behavioral operations are from a selected language from the group including C++ and Objective-C.

11. A computer, comprising:
  a storage medium configured to store
    a single common object simultaneously defined in a first computer language and a second computer language,
    a set of behavioral operations to be performed on said common object, and
    mixed source code instructions in said first computer language and said second computer language; and
  a processing unit connected to said storage medium, said processing unit performing a selected behavioral operation on said common object in response to said mixed source code instructions;
  wherein said storage medium is configured to define said common object as a set of instance variables characterizing an Objective-C object class data structure; and
  wherein said storage medium is configured to define said common object by specifying a C++ object class data structure through importation of said set of instance variables characterizing said Objective-C object class data structure.

12. The apparatus of claim 11 wherein said processing unit derives from said common object, a mixed object instance with C++ and Objective-C attributes.

13. The apparatus of claim 11 wherein said processing unit creates and destroys an instance of said common object in response to C++ processing operations.

14. The apparatus of claim 11 wherein said processing unit places said common object on a program stack.

* * * * *